Figure 1:
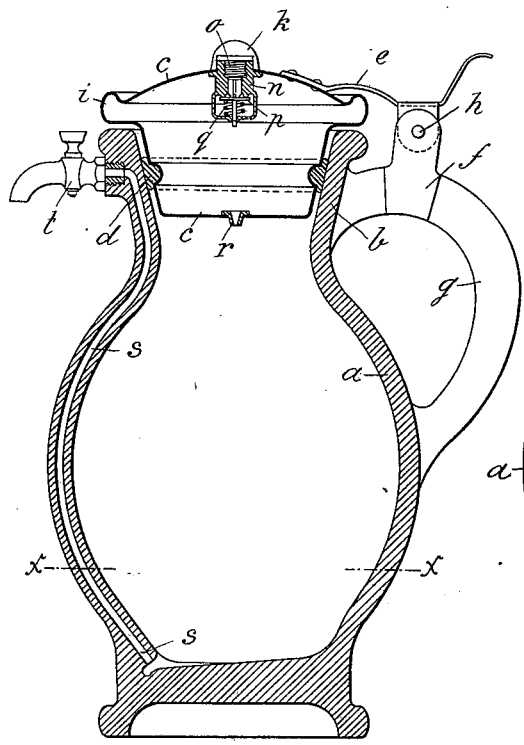

No. 615,169. Patented Nov. 29, 1898.
A. HEINEMANN.
SIPHON FOR BEER, &c.
(Application filed Aug. 5, 1898.)
(No Model.)

Witnesses:
E. B. Bolton
O. Dunn

Inventor:
Albert Heinemann
By Richards
his Attorneys.

UNITED STATES PATENT OFFICE.

ALBERT HEINEMANN, OF BERLIN, GERMANY.

SIPHON FOR BEER, &c.

SPECIFICATION forming part of Letters Patent No. 615,169, dated November 29, 1898.

Application filed August 5, 1898. Serial No. 687,852. (No model.)

*To all whom it may concern:*

Be it known that I, ALBERT HEINEMANN, merchant, a subject of the Emperor of Germany, and a resident of No. 12 Reichstagsufer, Berlin, in the Empire of Germany, have invented a new and useful Improved Siphon for Beer and the Like, of which the following is a full, clear, and exact description.

The numerous known siphons for beer, in which the beer is under the pressure of compressed carbonic acid, mostly show the great disadvantage of tubes or other such parts of the siphon dipping into the beer or otherwise coming in contact with the same. Experience has shown that both the appearance and taste of the beer are thereby impaired and the beer very soon spoiled unless special attention is paid to most scrupulous cleanliness. The siphon on which the present invention is based is free from these drawbacks, in so far as tubes and the like do not dip into the contents of the receptacle or come in contact therewith, but the drawing off of the contents of the vessel is effected through a passage provided in the side of the siphon and extending to the inclined bottom thereof, which passage may be easily and thoroughly cleaned every time the siphon is rinsed out. The compressed carbonic acid, which presses out the contents of the vessel through the passage provided with a discharge-cock, is contained in the lid of the siphon, which forms a suitable receptacle, in such manner that a constant carbonic-acid atmosphere presses upon the beer, which remains shut off from contact with atmospheric air until the siphon is completely emptied of its contents. For this purpose the cavity in the lid communicates by means of a nozzle having a correspondingly narrow passage with the interior of the siphon, with or without a reducing-valve, so that, according to the emptying of the contents of the siphon, the carbonic acid kept in the lid under corresponding pressure passes into the siphon and on opening the discharge-cock of the passage in the side of the siphon causes the beer to be forced out. The carbonic acid consequently serves as a means of conveyance for the beer to be retailed, as a means for preserving same on account of the complete shutting off of the air, and also as a means for keeping the beer fresh, in so far as it does not allow the natural carbonic acid of same to escape, but, according to the pressure, causes more or less an impregnation of the beer.

The hollow lid is so arranged that it is hermetically shut off from the siphon and after releasing a stopper can be filled with carbonic acid of any desired pressure through a filling-hole provided with a back-pressure valve. The lid is, however, also hinged to the handle of the siphon in the usual manner by a suitable connecting-piece, so that it may be opened for filling the siphon and also for emptying the whole contents of the siphon in case the carbonic-acid pressure should fail to act or not be sufficient. In the latter case the stopper of the lid is released, the lid opened, and the siphon emptied by pouring out its contents in the usual manner. This provision of the lid also allows of the very important filling of the siphon by means of the known isobarometric apparatus, the air being completely shut off, so that when filling the siphon from the barrel the beer does not come in contact with air. Directly before the beer is filled into the siphon, which with open lid, otherwise hermetically closed, is placed beneath the filling apparatus, the air is removed from the siphon by means of compressed carbonic acid and the siphon made air-tight, which is of moment for the function of the siphon and for preserving the beer. The known siphons do not allow of such filling and trial to be made.

Figure 2:
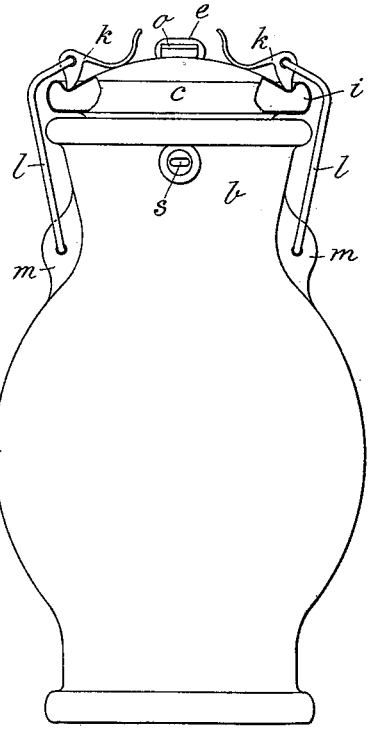
Figure 3:
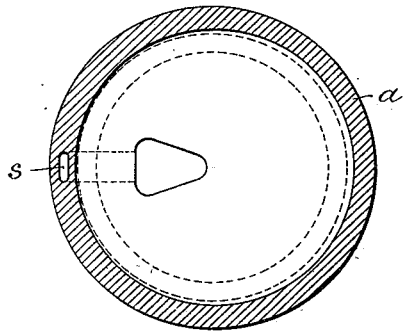
Figure 4:
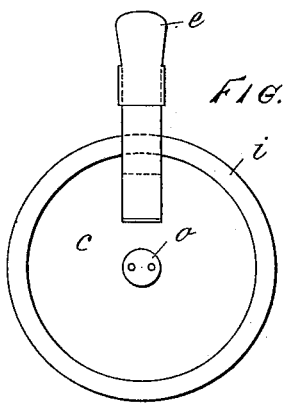

Referring to the accompanying drawings, which show a siphon made in accordance with this invention, Figure 1 is a vertical section, and Fig. 2 a front elevation, of the closed siphon. Fig. 3 is a horizontal cross-section on line *x x* of Fig. 1; Fig. 4, a plan of the lid formed as a carbonic-acid receptacle.

The siphon *a* is of any suitable form and has a conical neck *b* for the purpose of securing an air-tight sealing or closing by means of the correspondingly-formed lid *c*, with packing-ring *d*, such lid being pivotally connected with the connecting-piece *f* on the siphon-handle *g* by a plate *e*, also formed as handle, so that for filling, cleansing, or emptying the siphon by pouring out its contents the lid can be flapped back around the pin *h*.

According to the modification shown the lid c is in form of a receptacle made from metal of adequate thickness in order to offer resistance for the inner gas-pressure and having a rim i, behind which the locking-levers k engage, which are pivotally connected to bows l, which may be flapped up or down in brackets m of the siphon. In a hole in the top of the lid-receptacle c is inserted a ring n, which receives a screw-stopper o and guides a valve p, actuated by a spring q and acting as a back-pressure valve. In the bottom of the lid-receptacle is inserted a nozzle r, through which the carbonic acid passes to the interior of the siphon. After locking the levers k of the filled siphon the stopper o is removed and the hose of the carbonic-acid receptacle is screwed into the thread of the ring n. After the pressure of the carbonic acid in the lid-receptacle c has reached the necessary limit, ascertainable from a manometer, the hose is released, the back-pressure valve p automatically closes the ring n, and the stopper o is again screwed therein.

The carbonic acid is not only contained in the lid-receptacle c, but also in the free space between the lid-bottom and the liquid-level in the siphon.

In the side of the siphon is provided a passage s, extending to the bottom, which inclines toward the lower end of the passage, so that with adequate pressure of carbonic acid even the last drop of liquid is discharged from the siphon. According to the modification shown the passage s leads to the upper edge of the siphon and communicates with a discharge-cock t, through whose opening the contents of the siphon are emptied.

Having now particularly described and ascertained the nature of my said invention and in what manner the same is to be performed, I declare that what I claim, and wish to secure by Letters Patent, is—

1. In combination with the vessel a, a lid of hollow form adapted to form a complete closure for the vessel or to allow the mouth thereof to be completely open when removed therefrom, said lid having a back-pressure valve to hold the gas therein and an outlet leading from the lid into the interior of the vessel, substantially as described.

2. In combination, the vessel a, the lid of hollow form having a lateral extension and the packing d and adapted to form the stopper of the vessel, the back-pressure valve in the said lid and the free opening in the bottom of the lid to allow the gases to pass therefrom into the vessel, substantially as described.

In witness whereof I have hereunto set my hand in presence of two witnesses.

ALBERT HEINEMANN.

Witnesses:
   FRANZ KOLLM,
   C. H. DAY.